United States Patent [19]

Reed

[11] E Re. 30,003

[45] Reissued May 22, 1979

[54] LOW DRIFT SPRAY METHOD

[75] Inventor: Kenneth E. Reed, Windsor Heights, Iowa

[73] Assignee: Delavan Corporation, West Des Moines, Iowa

[21] Appl. No.: 828,912

[22] Filed: Aug. 29, 1977

Related U.S. Patent Documents

Reissue of:

[64] Patent No.: 3,948,444
Issued: Apr. 6, 1976
Appl. No.: 607,713
Filed: Aug. 25, 1975

U.S. Applications:

[62] Division of Ser. No. 414,733, Nov. 12, 1973, Pat. No. 3,934,823.

[51] Int. Cl.[2] ..... B05B 17/04

[52] U.S. Cl. ..... 239/11

[58] Field of Search ..... 239/1, 11, 466, 468, 239/490, 491, 494, 496, 497

[56] References Cited

U.S. PATENT DOCUMENTS

| | | | |
|---|---|---|---|
| 1,163,591 | 12/1915 | Eneas | 329/11 |
| 1,311,840 | 7/1919 | Parker | 239/11 |
| 1,668,271 | 5/1928 | Fisk | 239/DIG. 1 |
| 2,306,141 | 12/1942 | Richardson | 239/11 |
| 2,313,298 | 3/1943 | Martin et al. | 239/11 |
| 2,399,182 | 4/1946 | Gustafsson et al. | 239/491 |
| 2,428,748 | 10/1947 | Barz | 239/472 |
| 2,550,573 | 4/1951 | Lyman | 239/468 |
| 2,578,392 | 12/1951 | Bendersky et al. | 239/468 |
| 2,585,429 | 2/1952 | Boe | 239/11 |
| 3,347,471 | 10/1967 | Halls | 239/490 X |
| 3,540,658 | 11/1970 | Simmons | 239/472 |
| 3,666,183 | 5/1972 | Smith | 239/463 |
| 3,708,119 | 1/1973 | Vicard | 239/11 |
| 3,841,558 | 10/1974 | Fowler et al. | 239/11 |

FOREIGN PATENT DOCUMENTS

| | | | |
|---|---|---|---|
| 933977 | 9/1973 | Canada. | |
| 1628813 | 7/1970 | Fed. Rep. of Germany | 239/468 |

*Primary Examiner*—John J. Love
*Attorney, Agent, or Firm*—Allegretti, Newitt, Witcoff & McAndrews

[57] ABSTRACT

In low drift spray nozzles and a method of applying low drift sprays, liquid is formed in large droplets by imparting a swirling motion to the liquid in a chamber of the nozzle, passing the swirling liquid through a first orifice into another chamber of the nozzle which is larger in cross section than the orifice, and discharging the swirling liquid from the last mentioned chamber through a second orifice which is at least as large in cross section as the first orifice, whereby the discharged liquid forms a hollow geometric shape having large droplets of the liquid therein.

5 Claims, 13 Drawing Figures

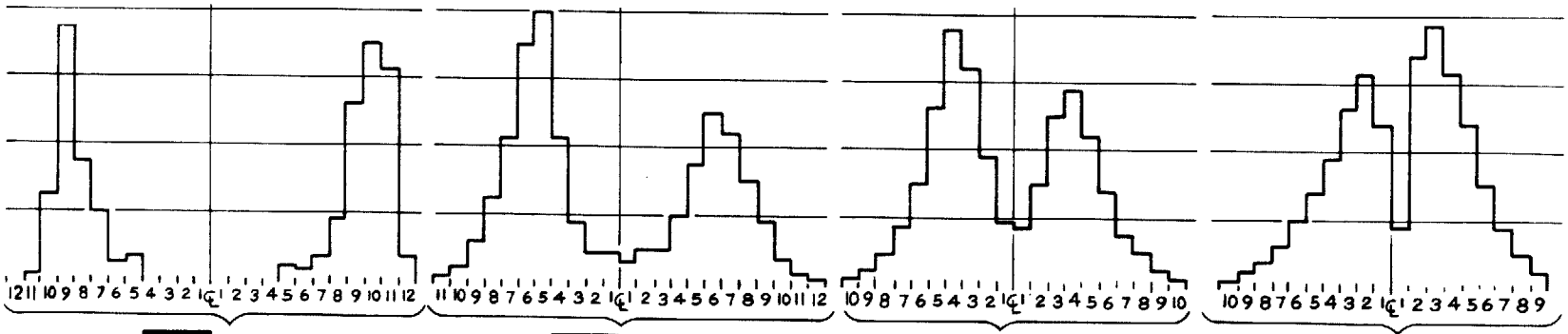
Fig. 6A
Fig. 6B
Fig. 6C
Fig. 6D
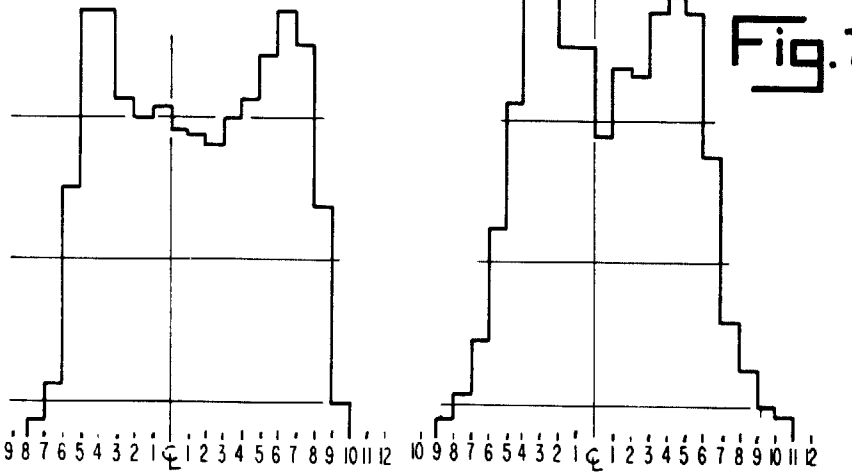
Fig. 7A
Fig. 7B
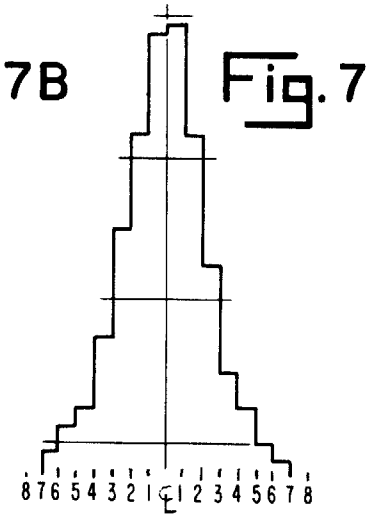
Fig. 7C
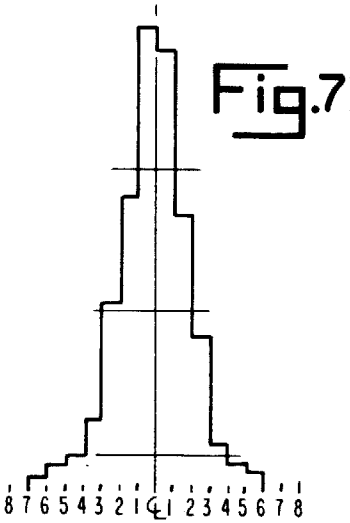
Fig. 7D

LOW DRIFT SPRAY METHOD

Matter enclosed in heavy brackets [ ] appears in the original patent but forms no part of this reissue specification; matter printed in italics indicates the additions made by reissue.

This is a division of application Ser. No. 414,733 filed Nov. 12, 1973 *now Patent No. 3,934,823.*

BACKGROUND AND SUMMARY OF THE INVENTION

This invention relates to low drift spray nozzles and, more particularly, to spray nozzles and methods of spraying in which the liquid spray comprises large droplets.

In numerous applications it is important that liquid which is to be handled is discharged in a manner and in a condition in which drift is minimized. By way of example, one such application in which drift must be minimized is in the application of conventional herbicides, pesticides and other farm chemicals. Another such application in which drift is critical is in present day irrigation type rigs in which partially treated sewage is applied to the large tracts of land. Potential problems involved in the application of such sewage are not only limited to odor, but also viruses in the sewage might be carried by small droplets to adjacent localities if drift is not stringently controlled. To underscore the problems in such sewage applications, Federal as well as local agencies have arbitrarily set limits on the amount of drift which is permissible in such sewage irrigation installations. Under these limits, drift is generally confined to within 200–300 feet of the point of application and droplets which drift beyond this range are not acceptable.

In order to remain within these acceptable drift standards, irrigation sewage disposal equipment in the past have employed flooding or deflector type nozzles which are generally operated at very low pressures, frequently as low as 3 or 4 psig. At these low pressures, the generation of large droplets results and the generation of fine droplets, which could create a drift hazard, is minimized. Several important disadvantages, however, follow from the use of such low pressures. It is frequently difficult to obtain a good spray pattern with such low pressures and consequently coverage uniformity is at best minimal. Also, any variation in the supply pressure or pressure losses in the equipment itself due to frictional losses or pressure drop inherent in the piping, will cause a change in flow rate through the nozzles which adversely effects uniformity of coverage. Such pressure drops or losses are indeed common, as will be evident when it is considered that irrigation equipment is frequently in excess of 1000 feet in length and this equipment normally rotates about a pivot point with the extremities of the irrigation rigging often crossing terrain that is not completely level, causing pressure variations due to ground elevation. These variations due to ground elevation may be as great as 3 to 5 psig.

The nozzles and methods of the present invention overcome these disadvantages. In a nozzle and method incorporating the principles of the present invention, liquid pressures greatly in excess of those previously mentioned, may be utilized and yet the generation of large droplets which are not subject to drift may be optimized. Accordingly, since the method and nozzles of the present invention are capable of utilizing substantially larger line pressures, the adverse effect of changes in elevation, frictional losses and the like are minimized. In the nozzles and method of the present invention, line pressures may be employed, which if employed with the conventional nozzles heretofore utilized in the art, would produce extremely fine droplets which would drift substantial distances. Moreover, the nozzles and method of the present invention are capable of delivering liquid at widely ranging flow rates of more than 50 gpm to as little as 0.2 gpm without a substantial loss in droplet quality. Finally, nozzles and method incorporating the principles of the present invention result in substantially improved patternation definition and uniform distribution of droplet sizes.

In a principal aspect of the present invention, a nozzle comprises a first chamber having a fluid inlet, swirl means for imparting a swirling motion to the fluid in the first chamber, a second vortex chamber, first orifice means between the first and second chambers communicating the swirling fluid from the first chamber to the second vortex chamber, the second vortex chamber being larger in cross section than the first orifice means, and second orifice means at the end of the second chamber, the second orifice means being at least as large as the first orifice means for discharging the swirling fluid from the second vortex chamber.

In another principal aspect of the present invention, a method of producing large droplets of liquids comprises imparting a swirling motion to the liquid, passing the swirling liquid through a first orifice into a chamber which is larger in cross section than the first orifice and such that the liquid continues to swirl in the chamber, and discharging the swirling liquid from the chamber through a second orifice which is at least as large as the first orifice, whereby the discharged liquid comprises a plurality of large droplets.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIGS. 6A–6D are patternation plots showing the radial patternation of the nozzle and method of the present invention as compared to radial patternations of three conventional nozzles; and FIG. 7A-7D are patternation plots showing "band" patternations of the nozzle and method of the present invention as compared to such patternation of three conventional nozzles.

DESCRIPTION OF THE PREFERRED EMBODIMENTS

Figure 1:
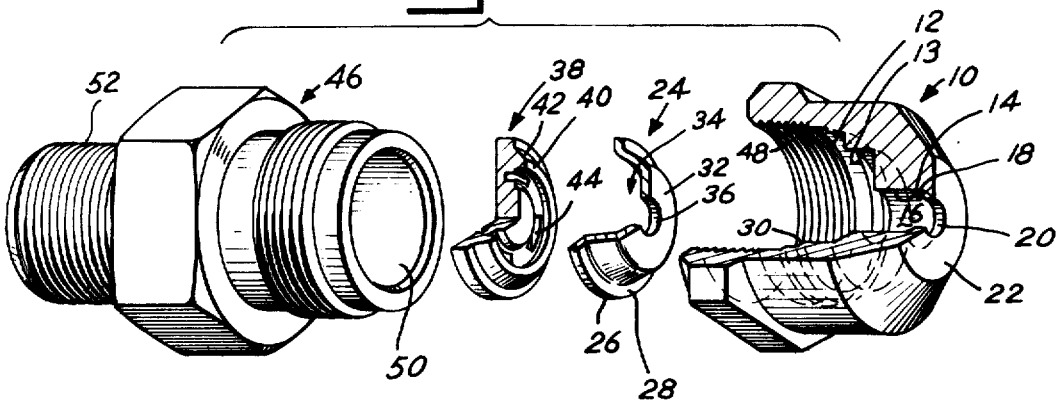
FIG. 1 is an exploded isometric view of a preferred embodiment of nozzle incorporating the principles of the present invention and which employs the method of the present invention.
Figure 2:
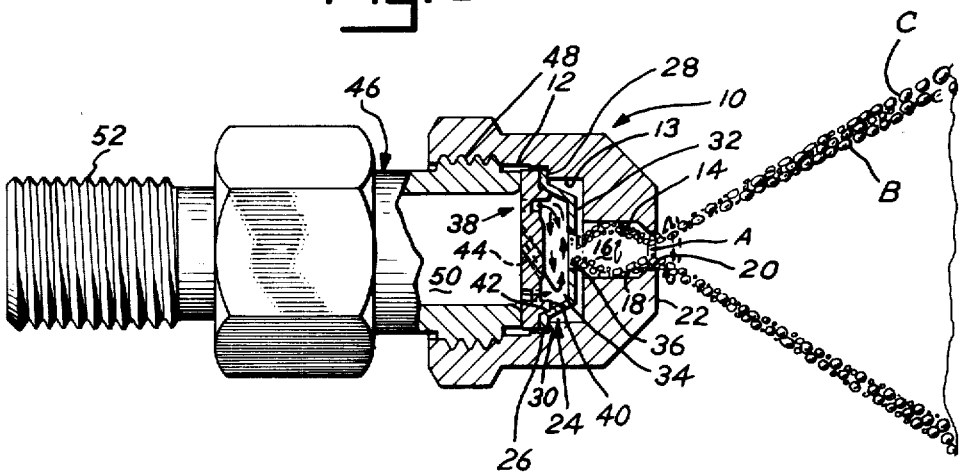
FIG. 2 is a cross sectioned elevation view of the assembled nozzle shown in FIG. 1 showing the fluid flow path of the fluid.

Referring particularly to FIGS. 1 and 2, a first preferred embodiment of nozzle is shown which is constructed in accordance with the principles of the present invention and which practices the method of the invention. The nozzle comprises a nozzle tip member 10 having a large passage 12, a passage of slightly decreased diameter 13, a passage 14 of still further decreased diameter aligned with each other along a common axis, the smaller passage 14 defining a vortex chamber 16. The vortex chamber 16 is chamfered at its end 18 opposite passage 13 and this chamfered surface leads to a circular discharge orifice 20 which opens through the end 22 of the tip member 10.

A cup shaped orifice disc 24, having an annular flange 26 extending peripherially therefrom, is inserted into the passage 12 until the forward face 28 of the flange 26 comes into contact with and is supported on an annular shoulder 30 formed of the junction of passages 12 and 13. The disc 24 is generally concave shaped having a flat bottom 32. As will be understood in the description of operation to follow of the present embodiment of nozzle, the hollowed out concave portion of the disc defines a swirl chamber 34 containing swirling liquid during operation of the nozzle. A circular "primary" orifice 36 is formed in the flat base or bottom 32 of the disc 24 and communicates the swirling liquid in chamber 34 with the vortex chamber 16 as shown in FIG. 2.

Again referring to FIGS. 1 and 2, a circular core disc 38 is next positioned in passage 12. The core disc 38 comprises an annular raised rib 40, the outer perimeter of which is preferably chamfered at 42. The raised rib 40 and its chamfered surface 42 are adapted to fit into and contact the interior of the orifice disc 24 as shown in FIG. 2. One or more angled liquid inlet passages 44 extend through core disc 38 in a substantial angled relationship to the central axis of the nozzle.

Finally, the discs 24 and 38 are firmly held in place by a threaded nozzle body 46 which is threaded into passage 12 at 48 and into contact with the rear side of the core disc 38. The nozzle body 46 includes a fluid passage 50 and is threaded at its other end 52 for receipt of a suitable hose or conduit from a source of liquid (not shown) which liquid is to be discharged through the nozzle.

An important feature of the present invention resides in the size relationship of the orifices 20 and 36 and the vortex chamber 16. It has been found that to generate a spray having the desired large droplet size, the vortex chamber 16 must have a diameter or cross sectional area which is substantially larger than that of either of the orifices 20 or 36. Moreover, it is important that the discharge orifice 20 be at least as large in cross section, if not larger than, the primary orifice 36.

Although it is not fully understood at this time exactly what the nature of the action is which occurs in the vortex chamber 16 which results in the large droplet size in the final nozzle discharge, it is believed that a certain amount of air is entrained in the relatively lower pressure swirling liquid in the vortex chamber 16. This air is supplied through the core A of the liquid which is being discharged through the discharge orifice 20 as shown in FIG. 2. During passage through the vortex chamber 16, the liquid droplets appear to agglomerate in the vortex chamber such that the spray which is discharged through the discharge orifice forms a well defined swirling hollow cone B (in the case of a circular orifice 20 as shown) which is filled with large droplets C of liquid. It is believed that the passage of at least some air through the core A of the discharge is important to achieve the results of the present invention, since when the size of the discharge orifice is reduced to a size smaller than the primary orifice such that the core A is substantially reduced in size, the result is a fine mist such as that normally produced by a conventional nozzle.

In operation, liquid is introduced through nozzle body 46 and angled passages 44 in the core disc 38 into the swirl chamber 34 defined between the disc 38 and the orifice disc 24. Swirl is imparted to this liquid in this chamber 34 due to the angularity of the passages 44. This swirling liquid is then discharged through the primary orifice 36 into the vortex chamber 16 where it continues to swirl, but expands against the walls 14 of the chamber, as shown in FIG. 2. Finally, this swirling liquid is discharged through the discharge orifice 20 in the form of a hollow cone B in the case of a circular orifice as is shown. The liquid in the discharge cone B comprises a plurality of substantially large droplets C of a size which reduces the likelihood of drift.

Figure 3:
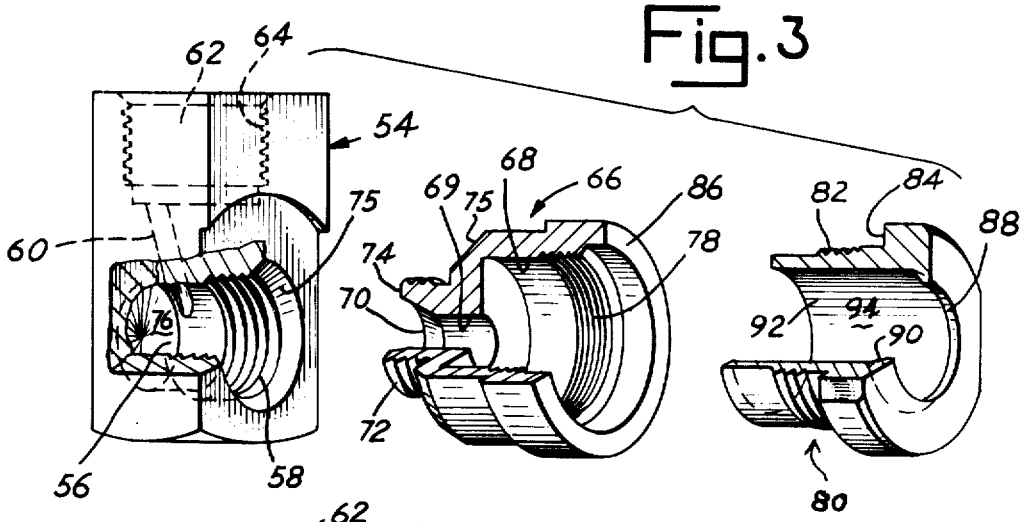
FIG. 3 is an exploded isometric view of another preferred embodiment of nozzle incorporating the principles of the present invention and which employs the method of the present invention.
Figure 4:
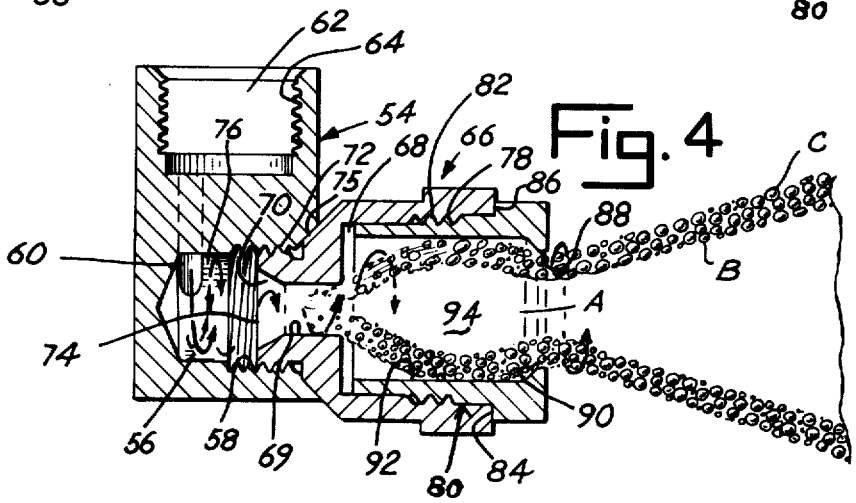
FIG. 4 is a cross sectioned elevation view of the assembled nozzle shown in FIG. 3 showing the fluid flow through the nozzle.

A second preferred embodiment of nozzle is shown in FIGS. 3 and 4. In this embodiment of nozzle, a body 54 includes a bore 56 which is threaded internally at 58. An angular liquid inlet passage 60 extends between the bottom of the bore 56 and another bore 62, the latter of which is also threaded at 64 to receive a suitable liquid supply conduit (not shown).

A tip member 66, comprising an enlarged passage 68, a smaller diameter passage 69 and a flared primary orifice 70 is threaded, via threads 72, into the threads 58 in bore 56 as shown in FIG. 4. When fully threaded into the bore 56, the left end 74 of the tip member 66 is spaced from the bottom of the bore 56 by engagement of the chamfered surfaces 75 to define a swirl chamber 76 into which the angular liquid inlet passage 60 discharges in substantially tangential relationship to the chamber 76.

The interior of passage 68 is also threaded over a part of its length at 78 and a second tip member 80 is threaded, via threads 82, into the threads 78 in passage 68 as shown in FIG. 4, until an enlarged shoulder 84 comes to rest against the edge 86 of member 66. A discharge orifice 88, preferably chamfered as shown at 90, is located in the end of the tip 80 and a passage 92 through tip member 80 defines a vortex passage 94 into which the swirling liquid is discharged from the chamber 76 through the primary orifice 70. As in the embodiment shown in FIGS. 1 and 2, the cross sectional dimension of the vortex chamber 94 is larger than the diameter of orifice 70 and its passage 69 and the discharge orifice 88 is as large if not larger than orifice 70 and passage 69.

The operation of the nozzle shown in FIGS. 3 and 4 is substantially identical to that previously described. Liquid is introduced through bore 62 and the angular inlet passage 60 into swirl chamber 76 where swirl is imparted to the liquid by way of the angular passage.

This swirling liquid then passes through the orifice 70 and expands, still swirling, into the vortex chamber 94. From the vortex chamber 94 the liquid is discharged through the discharge orifice 88 in the form of a swirling hollow cone B consisting of large droplets C.

Figure 5:
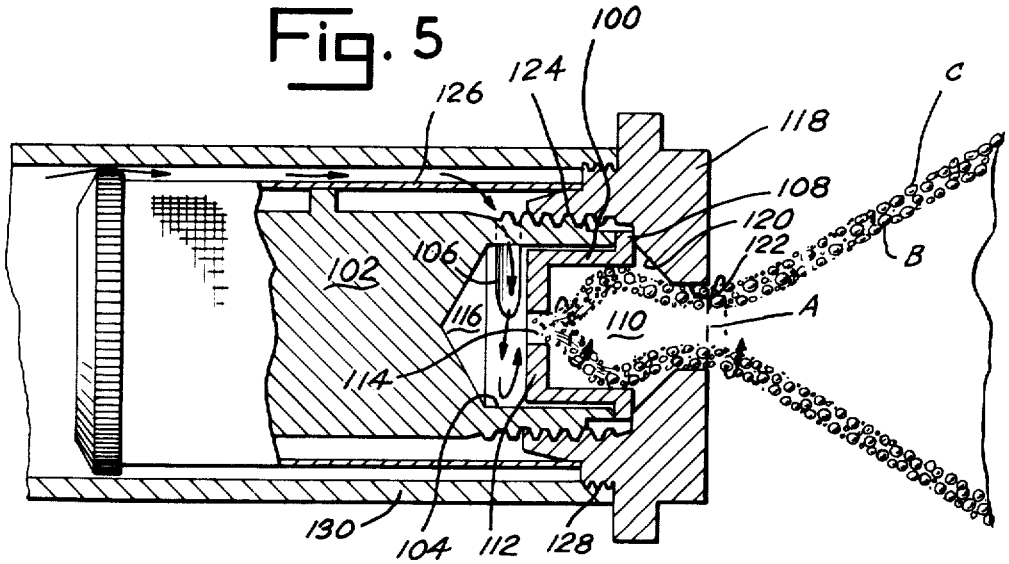
FIG. 5 is a cross sectioned elevation view of still another preferred embodiment of nozzle constructed in accordance with the principles of the invention and which employs the method of the present invention and which shows the fluid flow path through the nozzle.

Still another embodiment of nozzle is shown in FIG. 5 in which an insert member 100 is provided to form the primary orifice disc and vortex chamber. Referring to FIG. 5, a nozzle body 102 includes a bored recess 104 in one end thereof. An angular or tangential liquid inlet passage 106 extends into the base of this bore and the cup shaped insert member 100, having an annular flange 108, is positioned in the bore, the flange 108 being supported on the end of the body member 102. The insert member 100 is recessed to define a vortex chamber 110 and the flat bottom 112 of the insert member includes a circular primary orifice 114 as shown in FIG. 5. When positioned in the recess 104, bottom 112 of the insert member 100 is spaced from the bottom of the recess to define a swirl chamber 116 into which the angular inlet passage 106 communicates. A tip member 118 including a chamfered surface 120 terminating in a circular discharge orifice 122 is threaded onto the body member 102 at 124 and holds the insert member 100 in the recess 104.

In this embodiment, a strainer 126 is shown positioned over the body member 102 to remove solid contaminants which might otherwise foul the nozzle assembly. Finally, the entire assembly is threaded at 128 into the end of a liquid supply conduit 130 shown. Again the relationship between the sizes of the orifices 114 and 122 and the cross sectional dimension of the vortex chamber 110 is as previously described with respect to the embodiments shown in FIGS. 1–4.

The operation of the embodiment shown in FIG. 5 is also substantially identical to that previously described. The liquid passes through conduit 130, strainer 126 and the angular passage 106 which imparts a swirling motion to the liquid in the swirl chamber 116. This swirling liquid is then discharged through the primary orifice 114 into the vortex chamber 110 where the swirling liquid expands into contact with the walls of the vortex chamber. From the vortex chamber 110 the swirling liquid is discharged through the orifice 122 to form a hollow cone B having large droplets C of the liquid entrained therein.

As previously mentioned, the size relationship of the primary orifices 36, 70 and 114 and discharge orifices 20, 88 and 122 are important in the present invention as is the size relationship between the primary orifices and the cross sectional dimension of the vortex chambers 16, 94 and 110. Specifically, the cross sectional area or diameter of the discharge orifices 20, 88 and 122 should be at least as large, if not larger than, the cross sectional area or diameter of the primary orifices 36, 70 and 114, respectively. Also, the cross sectional diameter or area of the vortex chambers 16, 94 and 110 should be substantially larger than the cross sectional diameter or area of the primary orifices 36, 70 and 114, respectively. The length of the vortex chambers may be varied over wide ranges without substantial alteration of the droplet quality.

It has been found that the nozzles of the present invention provide a final spray cone having a droplet size and patternation which is substantially improved over a prior conventional nozzle operating at the same or less pressure and flow rate. For example, a nozzle constructed as shown in FIGS. 3 and 4 was operated at a line pressure of 40 psig with water as the liquid both with the tip member 80 removed to act as a conventional nozzle, and with the tip member inserted to practice the method of the present invention. In this nozzle, the minimum diameter of the primary orifice 70 at passage 69 was 0.531 inch and the discharge orifice 88 was 0.8 inch in diameter. In addition, another nozzle constructed as shown in FIGS. 3 and 4 was likewise operated under the same conditions with the tip 80 inserted and with the tip removed. This nozzle was the same as the previous nozzle, except that the primary orifice 88 in the last mentioned nozzle was reduced to 0.33 inch in diameter. It was found that the flow rate in both of these nozzles remained substantially unchanged when the tip member 80 was inserted or removed. Moreover, the droplet size in the discharge of the nozzle with the tip member inserted was visibly substantially larger than that in the spray cone of the nozzle where the tip member was removed.

In addition, tests were run on a nozzle constructed as shown in FIGS. 1 and 2. In this nozzle the core disc 38 was constructed of plastic. Again these tests were conducted utilizing water as a liquid at 40 psig line pressure. In these nozzles, the discharge orifice 20 was held constant in size at 0.125 inch in diameter and the diameter of the primary orifice 36 was varied between 0.063 and 0.1250 inch. The diameter of the vortex chamber 16 in each of these nozzles was 0.20 inch. It was found that such nozzles wherein the ratio of the diameter of the discharge orifice 20 to the diameter of the primary orifice 36 was less than 1.33 produced a spray which was too fine such as would result in substantial drift in use. Patternation tests were also conducted on nozzle constructed as shown in FIGS. 1 and 2 and as last described. Details of the patternation equipment and methods will not be set forth herein. For a general description of such equipment and methods as employed in radial patternation tests, reference should be had to Tate, R. W., Spray Patternation, Industrial & Engineering Chemistry, Vol. 52, p. 49A, Oct. 1960. The patternation tests included radial patternation tests in which the test nozzles were fixed four inches above the patternation tubes and the liquid consisted of water. The results of these tests are shown in FIGS. 6A–6D in which the units along the x-axis represent units of distance radially from the centerline C/L and the y-axis represent units of volume of liquid collected.

In FIG. 6A, the test results are shown for a nozzle constructed as shown in FIGS. 1 and 2 in which the tip member 10 was inserted as shown in FIG. 2. In this nozzle, the diameter of the primary orifice 36 was 0.063 inch, the diameter of the vortex chamber was 0.2 inch, and the diameter of the discharge passage was 0.125 inch.

In the remaining three FIGS. 6B–6D, radial patternation results are shown for three nozzles exactly the same as shown in FIGS. 1 and 2, but in which the tip member 10 was removed and the discs 24 and 38 retained to form conventional nozzles. These tests were conducted using the same liquid as that previously described. In the test shown in FIG. 6B, the size of the orifice 36 was the same as the nozzle of the invention shown in FIG. 6A, 0.063 inch, and the pressure of the water was also the same, 40 psig. The flow rate through the nozzles tested in FIGS. 6A and 6B was substantially identical, 0.26 gpm and 0.29 gpm, respectively.

In the test shown in FIG. 6C, the diameter of primary orifice 36 was enlarged to 0.078 inch, and to achieve the same 0.29 gpm flow rate, the pressure was reduced to 13 psig.

In the test shown in FIG. 6D, the diameter of the primary orifice 36 was further increased to 0.094 inch, and to maintain the same 0.29 gpm flow rate, the pressure was further reduced to 8 psig.

Upon consideration of FIGS. 6A–6D, it will be seen that sharp patternation definition clearly resulted in the nozzle of the present invention, i.e. that shown in FIG. 6A. In addition, discharge cone width of the nozzle of the present invention was superior. On the other hand, patternation was not as well defined in the remaining FIGS. 6B–6D as is shown by the presence of some liquid in what should be hollow center C/L of the cone and in the blurred "tailing off" at the periphery of the cone, i.e. at 10 and 11 units of distance away from the centerline. Moreover, the cone width of the conventional nozzles was generally less than the discharge cone of the invention nozzle.

Referring to FIGS. 7A–7D, the results of the "band" patternation tests are shown for the same nozzles, the same liquid and same pressures as described with respect to FIGS. 6A–6D, respectively. These tests are substantially identical to those shown in FIGS. 6A–6D, except that the test nozzles are mounted over a receiver having a plurality of longitudinally extending troughs extending in parallel to each other. The test nozzles were again set at four inches above the troughs.

As would be expected from the results shown in FIGS. 6A–6D, the patternation definition and discharge cone width of the nozzle of the present invention as shown in FIG. 7A was substantially superior to those of the conventional nozzles shown in FIGS. 7B–7D.

The droplet size produced by the nozzles as last described was also measured, again using water at a pressure of 40 psig. In the nozzle of the invention as described with respect to FIGS. 6A and 7A, the "Sauter mean" droplet diameter was measured at 362 microns with a maximum diameter of 787 microns, resulting in a ratio of maximum to mean diameter of slightly larger than 2 which is exceptionally good. For the same nozzle with the tip member 10 removed, as described with respect to FIGS. 6B and 7B, the "Sauter mean" droplet diameter was measured at 144 microns and the maximum diameter was 406 microns. Moreover, the total percentage of spray volume of droplets less than 42 microns in diameter was 1.93% in the latter nozzle and only 0.22% in the nozzle of the invention with the tip member 10 inserted. Thus, the uniformity of the spray of the same identical nozzle in which the tip member 10, i.e. the vortex chamber 16 and the discharge orifice 20, were removed, was about twice as poor as the nozzle of the invention, the maximum and mean diameters were substantially smaller, and the quantity of small droplets was substantially larger.

When the primary orifice 36 was increased in diameter to 0.078 inch, without the tip member 10, as described with respect to FIGS. 6B and 7C, and the liquid pressure was dropped to 13 psig to attain the same flow rate, the "Sauter mean" diameter increased to 217 microns and the percentage of droplets less than 42 microns decreased to 0.85%. Thus even at a lower pressure, this conventional nozzle did not produce mean droplet sizes as good as those of the nozzle of the present invention nor did it reduce the quantity of small droplets to the quantity realized by the invention nozzle.

It has also been found that the nozzles constructed in accordance with the present invention and the method thereof may be readily employed in nozzles of the "bypass" or "spill" type in which liquid is bled off the rear of the swirl chamber and returned to the source. Moreover, although the discharge orifices 20, 88 and 122 have been described in terms of a circular orifice, it is contemplated that other shapes of orifices, e.g. elliptical or slot shaped orifices, may be employed in the present invention if it is desired to obtain discharge shapes in the shape of a fan or other desired shape without departing from the principles of the present invention.

It will also be understood that although the principal application of the nozzles and method of the present invention have been described in terms of agricultural applications, the invention is not intended to be limited to such applications, but may be employed in any end use in which droplet size, definition or uniformity is important.

Finally, it will be understood that the embodiments of the present invention which have been described are merely illustrative of a few of the applications of the principles of the invention. Numerous modifications may be made by those skilled in the art without departing from the true spirit and scope of the invention.

What is claimed is:

1. A method of producing large droplets of liquid comprising imparting a swirling motion to said liquid, passing said swirling liquid through first orifice means into a chamber larger in cross section than said first orifice means and such that the liquid continues to swirl in the chamber, and producing a swirling discharge having a plurality of substantially large droplets of liquid therein by discharging the swirling liquid from said chamber through a second orifice at least as large in cross section as the first orifice means, *but substantially smaller in cross section than said chamber.*

2. The method of claim 1 wherein the area of said second orifice means is at least as large as the area of said first orifice means.

3. The method of claim 1 wherein said first and second orifice means are circular and said discharged liquid assumes the shape of a hollow cone.

4. The method of claim 3 wherein the ratio of the diameter of said second orifice means to the diameter of said first orifice means is at least 1.33.

5. The method of claim 1 wherein said discharged liquid assumes a hollow geometric shape.

* * * * *